United States Patent
Friebe et al.

(10) Patent No.: US 10,902,622 B2
(45) Date of Patent: Jan. 26, 2021

(54) METHOD AND DEVICE FOR GENERATING A VIEW AROUND A VEHICLE FOR A VEHICLE

(71) Applicant: Conti Temic microelectronic GmbH, Nuremberg (DE)

(72) Inventors: Markus Friebe, Gefrees (DE); Joerg Schrepfer, Tettau (DE); Rodrigo Garcia Marques, Bamberg (DE); Johannes Petzold, Kulmbach (DE); Georg Arbeiter, Kueps (DE); Stefan Milz, Sallburg-Ebersdorf (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 31 days.

(21) Appl. No.: 16/334,493

(22) PCT Filed: Sep. 21, 2017

(86) PCT No.: PCT/DE2017/200098
§ 371 (c)(1),
(2) Date: Mar. 19, 2019

(87) PCT Pub. No.: WO2018/072793
PCT Pub. Date: Apr. 26, 2018

(65) Prior Publication Data
US 2019/0213744 A1 Jul. 11, 2019

(30) Foreign Application Priority Data
Oct. 20, 2016 (DE) .................. 10 2016 220 651

(51) Int. Cl.
*G06T 7/40* (2017.01)
*G06K 9/46* (2006.01)
(Continued)

(52) U.S. Cl.
CPC ............ *G06T 7/40* (2013.01); *G06K 9/00791* (2013.01); *G06K 9/4652* (2013.01); *G06T 7/20* (2013.01);
(Continued)

(58) Field of Classification Search
CPC .... G06T 7/90; G06T 7/40; G06T 7/20; G06T 2207/30252; G06T 11/001; G06K 9/4652; G06K 9/00791
See application file for complete search history.

(56) References Cited

U.S. PATENT DOCUMENTS 8,319,618 B2 * 11/2012 Gomi .................. G06T 3/4038
340/435
9,676,331 B2 6/2017 Hartmann
(Continued)

FOREIGN PATENT DOCUMENTS

DE 102011077398 12/2012
DE 102012211025 1/2014
(Continued)

OTHER PUBLICATIONS

PCT, English translation of the International Search Report of the International Searching Authority for International Application PCT/DE2017/200098, dated Dec. 7, 2017, 2 pages, European Patent Office, HV Rijswijk, Netherlands.
(Continued)

*Primary Examiner* — Yon J Couso
(74) *Attorney, Agent, or Firm* — W. F. Fasse

(57) ABSTRACT

A method of generating a vehicle environment view for a vehicle, having has the following steps. Camera images are provided by vehicle cameras on the body of the vehicle. A vehicle environment view is calculated based on the camera images. A texture of a ground surface that is located below the vehicle body and is not visible to the cameras, is
(Continued)

determined within the vehicle environment view by performing a local color prediction and a movement-compensated texture prediction.

17 Claims, 2 Drawing Sheets

(51) Int. Cl.
 *G06K 9/00* (2006.01)
 *G06T 11/00* (2006.01)
 *G06T 7/90* (2017.01)
 *G06T 7/20* (2017.01)

(52) U.S. Cl.
 CPC .............. *G06T 7/90* (2017.01); *G06T 11/001* (2013.01); *G06T 2207/30252* (2013.01)

(56) References Cited

U.S. PATENT DOCUMENTS

| | | | |
|---|---|---|---|
| 9,811,743 B2* | 11/2017 | van Beek | G06K 9/00798 |
| 9,892,493 B2* | 2/2018 | Pekkucuksen | G06T 5/006 |
| 10,163,226 B2* | 12/2018 | Ermilios | G06T 7/80 |
| 2010/0104199 A1 | 4/2010 | Zhang et al. | |
| 2014/0347470 A1 | 11/2014 | Zhang et al. | |
| 2015/0008294 A1 | 1/2015 | Desbordes et al. | |
| 2020/0051435 A1* | 2/2020 | Hashimoto | B60R 1/00 |
| 2020/0258266 A1 | 8/2020 | Arbeiter et al. | |

FOREIGN PATENT DOCUMENTS

| | | |
|---|---|---|
| DE | 102016005463 | 11/2016 |
| GB | 2 525 053 | 10/2015 |

OTHER PUBLICATIONS

PCT, PCT International Preliminary Report on Patentability including English Translation of PCT Written Opinion of the International Searching Authority for International Application PCT/DE2017/200098, dated Apr. 23, 2019, 8 pages, International Bureau of WIPO, Geneva, Switzerland.

German, German Search Report for German Patent Application No. 10 2016 220 651.6, dated Jul. 7, 2017, 10 pages, German Patent and Trademark Office, Muenchen, Germany, with partial English translation, 7 pages.

M. Bertalmino et al., "Simultaneous Structure and Texture Image Inpainting", Proceedings of the 2003 IEEE Computer Society Conference on Computer Vision and Pattern Recognition (CVPR'03), IEEE Transactions on Image Processing, vol. 12(8), Aug. 2003, 6 pages (or pp. 882-889).

Antonio Criminisi et al., "Region Filling and Object Removal by Exemplar-Based Image Inpainting", IEEE Transactions on Image Processing, vol. 13(9), Sep. 2004, pp. 1200 to 1212.

Stern (online): "In diesem Video spielt Deutschland ganz allein" ("In this video, Germany plays all alone"), with partial English translation, http://www.stern.de/sport/fussball/wm-2014/news/halbfinale-ohne-brasilien-in-diesem-video-spielt-deutschland-ganz-allein-3954312.html, (video accessible at: https://www.youtube.com/watch?v=Znes1dPR0Y4, accessed on Jul. 6, 2017), 3 pages.

\* cited by examiner

METHOD AND DEVICE FOR GENERATING A VIEW AROUND A VEHICLE FOR A VEHICLE

FIELD OF THE INVENTION

The invention relates to a method and a device for generating a vehicle environment view for a vehicle, in particular for a land vehicle.

BACKGROUND INFORMATION

Vehicles are increasingly being equipped with systems for representing a vehicle environment view or with surround view systems. The surround view system can form part of a vehicle's driver assistance system, wherein the surround view system reproduces the environment of the vehicle in as detailed a manner as possible. In particular, the driver assistance system supports the driver of the vehicle during the performance of vehicle maneuvers. In conventional surround view systems, camera images provided by vehicle cameras provided on the body of the vehicle are evaluated. In this case, the vehicle cameras are located on the sides of the vehicle body and generate camera images of the vehicle environment.

However, the camera images which are supplied by the various vehicle cameras do not supply any image data of the ground surface situated below the vehicle body. Conventional surround view systems represent the ground surface located below the vehicle body in a uniform color. As a consequence, the ground surface located under the body of the vehicle, which is not visible to the vehicle cameras, is only represented insufficiently. Consequently, the vehicle environment view represented by the surround view system does not, for example, provide a driver of the vehicle with a realistic reproduction of the vehicle environment in the region of the ground surface. The support provided to the driver during the performance of driving maneuvers is thus adversely affected. Due to the insufficient reproduction of the ground surface, the vehicle body can therefore sustain damage during driving maneuvers, for example during parking maneuvers or the like.

SUMMARY OF THE INVENTION

It is therefore an object of the present invention to create a method for generating a more realistic vehicle environment view, in particular in the region of the ground surface of the vehicle, in order to support the driver more efficiently during the performance of driving maneuvers and to avoid damage to the vehicle body during the performance of such vehicle maneuvers.

This object can be achieved by a method for generating a vehicle environment view for a vehicle, having the features according to the invention as set forth herein.

The invention thus creates a method for generating a vehicle environment view for a vehicle having the following steps: provision of camera images by vehicle cameras which are provided on the body of the vehicle, and calculation of a vehicle environment view of the vehicle on the basis of the provided camera images, wherein a texture of a ground surface located below the vehicle body, which is not visible, is determined within the vehicle environment view by means of local color prediction and movement-compensated texture prediction.

In one possible embodiment of the method according to the invention, an original vehicle environment view of the vehicle is calculated on the basis of the camera images provided by the vehicle cameras, without determining the texture of the ground surface located below the vehicle body, which is not visible to the vehicle cameras.

In one possible embodiment of the method according to the invention, a local color prediction is performed in order to calculate a color prediction matrix, and a movement-compensated texture prediction is performed in order to calculate a texture prediction matrix based on the original vehicle environment view calculated.

In another possible embodiment of the method according to the invention, a boundary error is calculated along one boundary of the ground surface which is not visible between the original vehicle environment view and the calculated texture prediction matrix.

In another possible embodiment of the method according to the invention, error measures for pixels within the ground surface which is not visible are calculated as a function of the calculated boundary errors, in order to produce a weighting matrix.

In another possible embodiment of the method according to the invention, the color prediction matrix and the texture prediction matrix are combined in order to calculate the vehicle environment view, weighted with the determined weighting matrix, as follows:

$$FUA = GM \times FMP + (1-GM) \times TPM,$$

wherein FUA is the vehicle environment view,
GM is the weighting matrix,
FMP is the color prediction matrix, and
TPM is the texture prediction matrix.

In another possible embodiment of the method according to the invention, the movement-compensated texture prediction for calculating a texture prediction matrix, TPM, is effected as a function of odometric data captured using sensor technology.

According to a further aspect, the above object can be achieved by a device for generating a vehicle environment view, FUA, for a vehicle, having the features according to the invention as set forth herein.

The invention thus creates a device for generating a vehicle environment view, FUA, for a vehicle, having:
vehicle cameras which are mounted on the body of the vehicle and provide camera images of the environment of the vehicle,
a calculation unit which calculates a vehicle environment view of the vehicle on the basis of the provided camera images,
wherein a texture of a ground surface located below the vehicle body, which is not visible, is determined within the vehicle environment view by means of local color prediction and movement-compensated texture prediction,
and having an output unit which outputs the vehicle environment view calculated by the calculation unit.

In one possible embodiment of the device according to the invention, an original vehicle environment view of the vehicle is firstly calculated by the calculation unit on the basis of the camera images provided by the vehicle cameras without determining the texture of the ground surface located below the vehicle body, which is not visible to the vehicle cameras.

In another possible embodiment of the device according to the invention, a local color prediction is executed by the calculation unit in order to calculate a color prediction matrix and a movement-compensated texture prediction is executed by the calculation unit in order to calculate a texture prediction matrix based on the calculated original vehicle environment view.

In another possible embodiment of the device according to the invention, boundary errors are calculated by the calculation unit along one boundary of the ground surface which is not visible between the original vehicle environment view and the texture prediction matrix.

In another possible embodiment of the device according to the invention, error measures for pixels within the ground surface which is not visible are calculated by the calculation unit as a function of the calculated boundary errors, in order to produce a weighting matrix.

In another possible embodiment of the device according to the invention, the calculation unit of the device is designed to combine the color prediction matrix and the texture prediction matrix in order to calculate the vehicle environment view, weighted with the weighting matrix, as follows:

$$FUA = GM \times FMP + (1-GM) \times TPM,$$

wherein FUA is the vehicle environment view,
GM is the weighting matrix,
FMP is the color prediction matrix, and
TPM is the texture prediction matrix.

In another possible embodiment of the device according to the invention, the device contains at least one data memory for caching the calculated color prediction matrix and the calculated texture prediction matrix.

According to a further aspect, the above object can be achieved by a driver assistance system having the features according to the invention as set forth herein.

The invention thus creates a driver assistance system for a vehicle, having a device for generating a vehicle environment view which has vehicle cameras which are mounted on the body of the vehicle and which provide camera images of the environment of the vehicle, and a calculation unit which is suitable for calculating a vehicle environment view of the vehicle on the basis of the provided camera images, wherein a texture of a ground surface located below the vehicle body, which is not visible, is determined within the vehicle environment view by means of local color prediction and movement-compensated texture prediction.

According to a further aspect, the invention further creates a land vehicle having such a driver assistance system.

BRIEF DESCRIPTION OF THE DRAWINGS

Possible embodiments of the various aspects according to the invention are described in detail below, with reference to the appended figures, wherein.

DETAILED DESCRIPTION OF EXAMPLE EMBODIMENTS OF THE INVENTION

Figure 1:
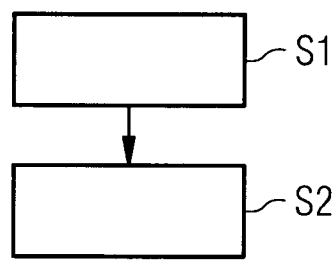
FIG. 1 shows a simple flowchart of one possible exemplary embodiment of a method according to the invention for generating a vehicle environment view for a vehicle.

As can be seen in FIG. 1, a method for generating a vehicle environment view, FUA, for a vehicle according to the first aspect of the invention, comprises two main steps in the case of the represented embodiment example.

In a first step S1, camera images are provided by vehicle cameras which are provided on the body of the vehicle.

In a further step S2, a vehicle environment view of the vehicle is calculated by a calculation unit on the basis of the camera images provided in step S1. In this case, a texture of a ground surface located below the vehicle body, which is not visible, is determined or calculated within the vehicle environment view by means of local color prediction and movement-compensated texture prediction.

On the basis of the camera images provided by the various vehicle cameras, an initial or original vehicle environment view, oFUA, of the relevant vehicle is firstly calculated in step S2 without determining a texture of the ground surface located below the body of the vehicle which is not visible to the vehicle cameras. A local color prediction for calculating a color prediction matrix FMP and a movement-compensated texture prediction for calculating a texture prediction matrix TPM are subsequently performed by the calculation unit based on the original vehicle environment view oFUA. Prediction algorithms can be executed in this case. The calculated color prediction matrix FMP and the movement-compensated texture prediction matrix TPM can, in one possible embodiment, be cached in one or various data memories for further data processing. In step S2, a boundary error along one boundary of the ground surface which is not visible is preferably calculated between the original vehicle environment view oFUA and the calculated, cached texture prediction matrix TPM. In step S2, error measures for pixels within the ground surface which is not visible are calculated as a function of the calculated boundary errors, in order to produce a weighting matrix GM. The weighting matrix can likewise be cached in a data memory for further data processing. In step S2, the cached color prevention prediction matrix FMP and the cached texture prediction matrix TPM are combined by the calculation unit in order to calculate the vehicle environment view FUA, weighted with the cached weighting matrix GM, as follows:

$$FUA = GM \times FMP + (1-GM) \times TPM,$$

wherein FUA is the vehicle environment view,
GM is the weighting matrix,
FMP is the color prediction matrix, and
TPM is the texture prediction matrix.

The movement-compensated texture prediction executed by the calculation unit in step S2 in order to calculate the texture prediction matrix TPM can, in one possible embodiment, be effected as a function of odometric data captured using sensor technology. The odometric data are, in this case, supplied by sensors which are likewise mounted on the body of the vehicle.

Figure 2:
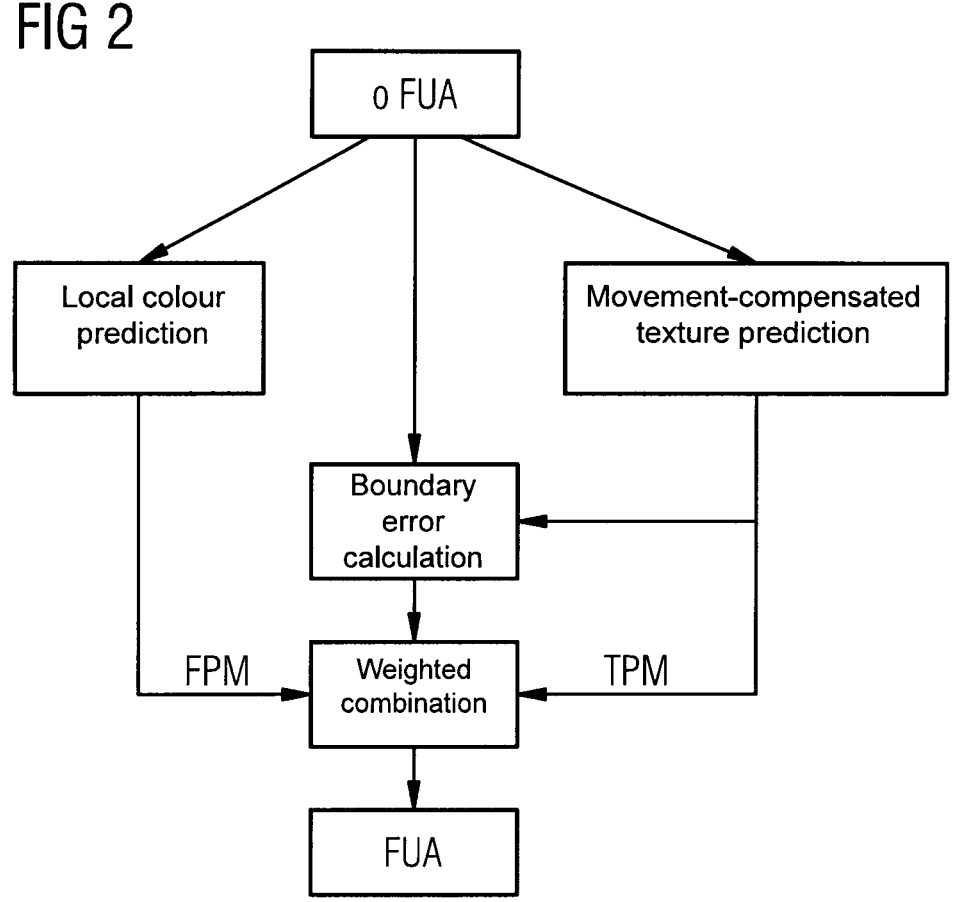
FIG. 2 shows a schematic representation of one possible embodiment example of the method according to the invention for generating a vehicle environment view for a vehicle.

FIG. 2 schematically shows a further diagram in order to represent one embodiment example of the method according to the invention for generating a vehicle environment view FUA for a vehicle.

An original vehicle environment view oFUA or a surround view image is firstly calculated without determining a texture of the ground surface located below the vehicle body, which is not visible to the vehicle cameras, on the basis of the camera images. Based on this original vehicle environment view oFUA, a local color prediction is, on the one hand, performed in order to calculate a color prediction matrix FMP and, on the other hand, a movement-compensated texture prediction is executed in order to calculate a texture prediction matrix TPM. The calculated color prediction matrix FMP and the texture prediction matrix TPM are subsequently preferably cached for further data processing. Furthermore, boundary errors along one boundary of the ground surface which is not visible are preferably calculated between the original vehicle environment view oFUA and the calculated and cached texture prediction matrix TPM, in a further intermediate step. The error measures for pixels within the ground surface which is not visible are preferably calculated as a function of the calculated boundary errors, in order to produce a weighting matrix GM. The ground surface below the vehicle body can be represented by a plurality of pixels. In a conventional land vehicle, the ground surface below the vehicle body is typically rectangular and can be provided with a corresponding two-dimensional weighting matrix GM. If, for example, the ground surface is reproduced with 200×500 pixels, the weighting matrix has 200 lines and 500 columns. The weighting matrix GM consequently comprises a weighting factor for each pixel of the ground surface, which weighting factor is determined by the calculation unit on the basis of the determined error measures as a function of the calculated boundary errors. The calculated weighting matrix with the weighting factors contained therein is preferably cached and serves as the basis for calculating the vehicle environment view FUA of the vehicle. In one preferred embodiment, the cached color prediction matrix FMP and the cached texture prediction matrix TPM are combined, weighted with the cached weighting matrix GM, as follows:

$$FUA = GM \times FMP + (1-GM) \times TPM.$$

The calculated vehicle environment view FUA comprises a texture for the ground surface located below the vehicle body and consequently realistically reproduces the environment of the vehicle, including the ground surface. The calculated vehicle environment view FUA can be output by means of an output unit. In one possible embodiment, the calculated vehicle environment view FUA is output directly on a display unit of a driver assistance system DAS to a driver of the vehicle. In another possible embodiment, the calculated vehicle environment view FUA, including the ground surface provided with a texture, is cached for further data processing. For example, driver assistance functions of a driver assistance system can further evaluate the image data of the calculated, cached vehicle environment view FUA and provide corresponding driver assistance system auxiliary functions for the driver of the vehicle. The evaluation of the camera images which are provided by the vehicle cameras and the calculation of the vehicle environment view FUA are effected in one preferred embodiment in real time. The calculation unit, which calculates the vehicle environment view FUA with the aid of the color prediction and the movement-compensated texture prediction in real time, can be one or more microprocessors. The calculation of the vehicle environment view FUA can be performed if the relevant vehicle is stationary or if the vehicle is moving over the ground. The number of the various vehicle cameras, which can be mounted for example on the sides of the body of the vehicle, can vary.

Figure 3:
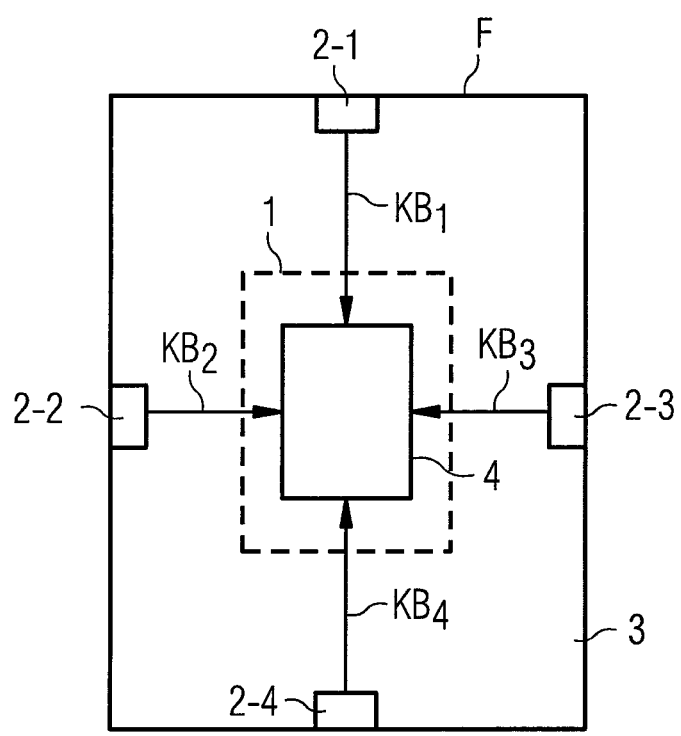
FIG. 3 shows a simple block diagram for representing one exemplary embodiment example of a device according to the invention for generating a vehicle environment view for a vehicle.

FIG. 3 shows a simple block diagram of one exemplary embodiment example of a device 1 according to the invention for generating a vehicle environment view FUA for a vehicle. The device 1 continually obtains camera images of the vehicle environment from various vehicle cameras 2-1, 2-2, 2-3, 2-4 by means of appropriate signal lines. The vehicle cameras 2-$i$ are mounted on the body 3 of a vehicle V. In this case, the various vehicle cameras 2-$i$ are preferably located on various sides of the vehicle body 3. In the embodiment example represented in FIG. 3, the vehicle has four vehicle cameras which are mounted on the front side, the back side and on the two longitudinal sides of the vehicle V. The vehicle cameras 2-$i$ can, in one possible embodiment, be so-called fish-eye cameras, the fields of view of which preferably overlap. The device 1 for generating the vehicle environment view FUA contains, in the case of the represented embodiment example, a calculation unit 4. The calculation unit 4 preferably contains one or more microprocessors for image data processing in real time. The calculation unit 4 obtains camera images CI from the various vehicle cameras 2-$i$ by means of the signal lines. The calculation unit 4 calculates a vehicle environment view FUA of the vehicle V on the basis of the provided, received camera images CI, wherein a texture of a ground surface located below the vehicle body 3, which is not visible, is determined or calculated within the vehicle environment view FUA by means of local color prediction and movement-compensated texture prediction. In the embodiment example represented in FIG. 3, the vehicle body 3 of the land vehicle V is configured rectangularly, so that a correspondingly rectangular ground surface which is not visible is located below the vehicle body 3, which cannot be captured by the vehicle cameras 2-$i$. On the basis of the camera images CI provided by the vehicle cameras 2-$i$, an original vehicle environment view oFUA of the vehicle V is firstly calculated by the calculation unit 4 without determining a texture of the ground surface located below the vehicle body 3, which cannot be captured by the various vehicle cameras 2-$i$. A local color prediction for calculating a color prediction matrix FMP and a movement-compensated texture prediction for calculating a texture prediction matrix TPM are subsequently performed by the calculation unit 4 in real time based on the original vehicle environment view oFUA. In this case, the calculation unit 4 can execute the relevant color prediction algorithms and texture prediction algorithms. The calculation unit 4 of the device 1 subsequently calculates boundary errors along one boundary of the ground surface which is not visible between the cached original vehicle environment view oFUA and the cached texture prediction matrix TPM. Error measures for pixels within the ground surface which is not visible are further calculated by the calculation unit 4 as a function of the calculated boundary errors, in order to produce a weighting matrix GM. Finally, the color prediction matrix FMP and the texture prediction matrix TPM are combined by the calculation unit 4 in order to calculate the vehicle environment view FUA, weighted with the weighting matrix GM, as follows:

$$FUA = GM \times FMP + (1-GM) \times TPM.$$

wherein FUA is the vehicle environment view,
GM is the weighting matrix,
FMP is the color prediction matrix, and
TPM is the texture prediction matrix.

An output unit, by means of which the calculated vehicle environment view FUA is output, is preferably connected to the calculation unit 4. The output unit can, in one possible embodiment, be a display unit which outputs the calculated vehicle environment view FUA to a driver of the vehicle V. Furthermore, the output unit can comprise a data interface with a further data processing unit which further evaluates the vehicle environment view FUA. In this case, in one possible embodiment, further driver assistance units of a driver assistance system DAS can act quickly, on the basis of the calculated vehicle environment view FUA, in order to provide or calculate diverse auxiliary functions or driver assistance functions for the driver of the vehicle V. The device 1 according to the invention for generating a vehicle environment view FUA contains a calculation unit 4, in particular a processor, which is preferably suited to executing the calculation step S2 provided in step S2 in real time. In one possible embodiment, the movement-compensated texture prediction is effected in order to calculate the texture prediction matrix TPM as a function of odometric data which are captured by sensors which are mounted on the body 3 of the vehicle V.

The method according to the invention for generating a vehicle environment view FUA, as represented by way of example in FIG. 1, and the device 1 according to the invention for generating a vehicle environment view FUA for a vehicle V, as represented by way of example in FIG. 3, make it possible to generate a vehicle environment view FUA, both for a vehicle V which is stationary on the ground and for a vehicle V moving across the ground. If the vehicle V is moving, the image quality of the calculated vehicle environment view FUA is, as a general rule, higher. Therefore, the method according to the invention is suitable for generating a vehicle environment view FUA, first and foremost, for mobile or moving vehicles. The method according to the invention and the device 1 according to the invention for generating a vehicle environment view FUA are preferably deployed for a land vehicle which is moving over the ground. The land vehicle can be a conventional road vehicle, in particular a car or truck, or an agricultural vehicle which is moving over a non-asphalted ground surface.

The invention claimed is:

1. A method comprising the steps:
   a) with cameras mounted on a vehicle body of a vehicle, capturing camera images of a vehicle environment that includes a visible region of a ground surface outside the vehicle, wherein the visible region of the ground surface is visible to the cameras and is represented in the camera images;
   b) processing the camera images, and based thereon generating an initial vehicle environment view that represents the vehicle environment including the visible region of the ground surface and not including a non-visible region of the ground surface, wherein the non-visible region of the ground surface is located under the vehicle body, is not visible to the cameras, and is not represented in the camera images;
   c) based on the initial vehicle environment view, performing a local color prediction to calculate a color prediction matrix, and performing a movement-compensated texture prediction to calculate a texture prediction matrix;
   d) generating a synthesized texture of the non-visible region of the ground surface from the texture prediction matrix and the color prediction matrix; and
   e) generating a final vehicle environment view that represents the vehicle environment including the visible region of the ground surface as represented in the initial vehicle environment view, and that represents the non-visible region of the ground surface with the synthesized texture.

2. The method according to claim 1, further comprising calculating boundary errors as differences between the initial vehicle environment view and the texture prediction matrix at locations along a boundary between the non-visible region of the ground surface and the visible region of the ground surface.

3. The method according to claim 2, wherein the non-visible region of the ground surface is represented by plural pixels, and further comprising calculating respective error measures for the pixels dependent on the boundary errors, and producing a weighting matrix from the error measures.

4. The method according to claim 3, wherein the generating of the synthesized texture of the non-visible region comprises combining the texture prediction matrix and the color prediction matrix respectively weighted dependent on the weighting matrix.

5. The method according to claim 4, wherein the combining of the texture prediction matrix and the color prediction matrix is performed according to:

$$(GM \times FMP) + ((1-GM) \times TPM)$$

wherein GM is the weighting matrix, FMP is the color prediction matrix, and TPM is the texture prediction matrix.

6. The method according to claim 1, wherein the movement-compensated texture prediction is performed as a function of sensor-captured odometric data of the vehicle.

7. The method according to claim 1, further comprising displaying the final vehicle environment view via a display unit to a driver of the vehicle.

8. The method according to claim 1, further comprising providing the final vehicle environment view as an input to a driver assistance system of the vehicle, and controlling a driver assistance function of the driver assistance system dependent on the final vehicle environment view.

9. A device for a vehicle, comprising:
   cameras that are mounted on a vehicle body of the vehicle, and that are configured to capture camera images of a vehicle environment including a visible region of a ground surface outside the vehicle, wherein the visible region of the ground surface is visible to the cameras and is represented in the camera images;
   a calculation unit; and
   an output unit;
   wherein:
   the calculation unit is configured to process the camera images, and based thereon to generate an initial vehicle environment view that represents the vehicle environment including the visible region of the ground surface and not including a non-visible region of the ground surface, wherein the non-visible region of the ground surface is located under the vehicle body, is not visible to the cameras, and is not represented in the camera images;
   the calculation unit is configured to perform a local color prediction so as to calculate a color prediction matrix, and to perform a movement-compensated texture prediction so as to calculate a texture prediction matrix, respectively based on the initial vehicle environment view;
   the calculation unit is configured to generate a synthesized texture of the non-visible region of the ground surface from the texture prediction matrix and the color prediction matrix;
   the calculation unit is configured to generate a final vehicle environment view that represents the vehicle environment including the visible region of the ground surface as represented in the initial vehicle environment view, and that represents the non-visible region of the ground surface with the synthesized texture; and
   the output unit is configured to output the final vehicle environment view.

10. The device according to claim 9, wherein the calculation unit is configured to calculate boundary errors as differences between the initial vehicle environment view and the texture prediction matrix at locations along a boundary between the non-visible region of the ground surface and the visible region of the ground surface.

11. The device according to claim 10, wherein the non-visible region of the ground surface is represented by plural pixels, and wherein the calculation unit is configured to calculate respective error measures for the pixels dependent on the boundary errors, and to produce a weighting matrix from the error measures.

12. The device according to claim 11, wherein the calculation unit is configured to generate the synthesized texture of the non-visible region by combining the texture prediction matrix and the color prediction matrix respectively weighted dependent on the weighting matrix.

13. The device according to claim 12, wherein the calculation unit is configured to perform the combining of the texture prediction matrix and the color prediction matrix according to:

$$(GM \times FMP) + ((1 - GM) \times TPM)$$

wherein GM is the weighting matrix, FMP is the color prediction matrix, and TPM is the texture prediction matrix.

14. The device according to claim 9, further comprising sensors configured to capture odometric data of the vehicle, and wherein the calculation unit is configured to perform the movement-compensated texture prediction as a function of the odometric data.

15. The device according to claim 9, further comprising a data memory configured to cache the color prediction matrix and the texture prediction matrix.

16. A driver assistance system for the vehicle, in combination with the device according to claim 9.

17. The vehicle, being a land vehicle, in combination with the driver assistance system according to claim 16.

* * * * *